United States Patent
Lee et al.

(10) Patent No.: US 12,015,741 B1
(45) Date of Patent: Jun. 18, 2024

(54) PRINTING APPARATUS AND METHOD OF OPERATING THE SAME TO GENERATE AN ALERT SIGNAL

(71) Applicant: Hand Held Products, Inc., Charlotte, NC (US)

(72) Inventors: Phek Thong Lee, Singapore (SG); Christian Knut Schulz-Janisch, Singapore (SG); Kin Song Chan, Singapore (SG); Teng Beng Low, Singapore (SG); Jennelyn Libuit Requinto, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/323,929

(22) Filed: May 25, 2023

(51) Int. Cl.
  *H04N 1/00* (2006.01)
  *G06F 3/01* (2006.01)

(52) U.S. Cl.
  CPC ......... *H04N 1/00037* (2013.01); *G06F 3/016* (2013.01); *H04N 1/00408* (2013.01); *H04N 1/0049* (2013.01)

(58) Field of Classification Search
  USPC .................................................. 358/1.14
  See application file for complete search history.

(56) References Cited

U.S. PATENT DOCUMENTS

| | | |
|---|---|---|
| 2004/0174340 A1 | 9/2004 | Bruneau et al. |
| 2009/0315964 A1* | 12/2009 | Tomita ............... B41J 17/24 347/104 |
| 2020/0285435 A1* | 9/2020 | Miyauchi ............ G06F 3/1292 |

(Continued)

FOREIGN PATENT DOCUMENTS

JP  2002-127571 A  5/2002

OTHER PUBLICATIONS

Joseph Turner et al., "Dynamically Adjusting Notification Alerts based on Device Position and User Activity," Technical Disclosure Commons, Defensive Publications Series, 1-6, (Jan. 17, 2022). [Retrieved from the Internet Sep. 21, 2023: URL: <https://www.tdcommons.org/cgi/viewcontent.cgi?article=5947&context=dpubs_series>].

(Continued)

*Primary Examiner* — Jacky X Zheng

(74) *Attorney, Agent, or Firm* — Alston & Bird LLP

(57) ABSTRACT

Various embodiments are directed to printing apparatuses and methods of operating the same. In various embodiments, a method of operating a printing apparatus to generate to generate an alert signal corresponding to a detected operating condition associated with the printing apparatus comprises selectively operating a drive component to generate an alert signal corresponding to a detected operating condition defined by the printing apparatus, the alert signal being defined by a vibration of the printing apparatus, wherein the drive component is configured to be operably engaged with a print media disposed within the printing apparatus such that the operation of the drive component causes a corresponding movement of the print media along a printing path defined by the printing apparatus; and wherein an operation of the drive component is defined at least in part by a rotation of the drive component in one or more rotational directions about a central axis.

20 Claims, 5 Drawing Sheets

(56) References Cited

U.S. PATENT DOCUMENTS

2023/0109044 A1* 4/2023 Teoh .................. B41J 29/38
                                                          347/19

OTHER PUBLICATIONS

Samsung, "Understanding the status LED," Samsung Setup Manual, 2 pages, (May 8, 2015). [Retrieved from the Internet Sep. 21, 2023: URL: <http://www.samsungsetup.com/ts/manual/Samsung%20ML-2160%20Series/English/manual/CHDJIBEE.htm>].
Stephen Perkins, "How to set custom notification vibration patterns on your Android phone," Android Police, 1-15, (Mar. 11, 2022). [Retrieved from the Internet Sep. 21, 2023: URL: <https://www.androidpolice.com/how-to-create-custom-notification-vibration-patterns/>].

* cited by examiner

PRINTING APPARATUS AND METHOD OF OPERATING THE SAME TO GENERATE AN ALERT SIGNAL

FIELD OF THE INVENTION

Various embodiments described herein relate generally to printers, and more particularly, to methods of controlling various printer components to facilitate execution of printer operations.

BACKGROUND

Applicant has identified many technical challenges and difficulties associated with conventional printing apparatuses, such as industrial and/or mobile thermal printers. Through applied effort, ingenuity, and innovation, Applicant has solved problems related to these printer apparatuses by developing solutions embodied in the present disclosure, which are described in detail below.

BRIEF SUMMARY

Various embodiments are directed to printing apparatuses and methods of operating the same. In various embodiments, a method of operating a printing apparatus to generate an alert signal corresponding to a detected operating condition associated with the printing apparatus may comprise selectively operating a drive component to generate an alert signal corresponding to a detected operating condition defined by the printing apparatus, the alert signal being defined at least in part by a vibration of at least a portion of the printing apparatus, wherein the drive component is configured to be operably engaged with at least a portion of a print media disposed within the printing apparatus such that the operation of the drive component causes a corresponding movement of the print media along a printing path defined by the printing apparatus; and wherein an operation of the drive component is defined at least in part by a rotation of the drive component in one or more rotational directions about a central axis.

In various embodiments, selectively operating the drive component to generate the alert signal may comprise causing the one or more drive components to exhibit a first rotation in a first rotational direction; and upon exhibiting the first rotation in the first rotational direction, causing the drive component to exhibit a second rotation in a second rotational direction opposite the first rotational direction, wherein drive component is operated such that the first rotation and the second rotation are executed in series to define at least substantially consecutively executed operations. In certain embodiments, the vibration may be defined at least in part by a movement of the at least a portion of the printing apparatus resulting from the first rotation and the second rotation. In certain embodiments, causing the one or more drive components to exhibit the first rotation and the second rotation may include generating, via a controller, one or more control signals configured to cause the drive component to exhibit the first rotation and the second rotation, and transmitting the one or more control signals to a motor assembly communicatively connected to the drive component. Further, in certain embodiments, selectively operating the drive component to generate the alert signal may further comprise upon exhibiting the second rotation in the second rotational direction, causing the drive component to exhibit a third rotation in the first rotational direction, wherein drive component is operated such that the third rotation is executed in series with the first rotation and the second rotation.

In various embodiments, the vibration defining the alert signal may be defined by a plurality of linear movements of the at least a portion of the printing apparatus. In certain embodiments, the linear movements defining the vibration may be of a sufficient magnitude such that the vibration is perceptible to a user via a haptic sensing means. In various embodiments, the method may further comprise detecting, via a controller, the operating condition defined by the printing apparatus. In various embodiments, the drive component may comprise a platen roller disposed at least partially within the printing apparatus and configured to rotate in one of a first rotational direction and a second rotational direction about the central axis to facilitate a movement of the at least a portion of the print media engaged therewith. In certain embodiments, operating the drive component may comprise selectively operating a drive motor communicatively connected to the platen roller by transmitting one or more control signals to the drive motor to drive the rotation of the platen roller about the central axis.

In various embodiments, the method may further comprise selectively operating a plurality of drive components to generate the alert signal. In certain embodiments, operating the plurality of drive components may include transmitting one or more control signals to the plurality of drive components to cause each of the plurality of drive components to rotate about the respective central axes in the same rotational direction. In various embodiments, the method may further comprise selectively operating the drive component to generate a second alert signal corresponding to a second detected operating condition defined by the printing apparatus, the second alert signal being defined at least in part by a second vibration of the at least a portion of the printing apparatus. In certain embodiments, the first vibration defining the alert signal may be defined at least in part by a first vibration pattern, and wherein the second vibration defining the second alert signal is defined at least in part by a second vibration pattern that is at least substantially different than the first vibration pattern. Further, in certain embodiments, the first vibration defining the alert signal may be defined by one or more vibration characteristics, the one or more vibration characteristics being defined by one or more of a vibration intensity, a vibration length, a vibration quantity, and a vibration pattern.

In certain embodiments, the detected operating condition may be defined by one or more of an error status and a warning status associated with one or more components of the printing apparatus at a particular instance. Further, in certain embodiments, the detected operating condition may be defined by a normal operation status associated with one or more components of the printing apparatus at the particular instance. Further still, the method may further comprise detecting, via a controller, the detected operating condition and a second detected operating condition defined by the printing apparatus. In certain embodiments, the second detected operating condition may be defined by a second error status associated with a second component of the printing apparatus at the particular instance. In various embodiments, the method may further comprise generating a second alert signal corresponding to the detected operating condition defined by the printing apparatus, the second alert signal being defined by an LED indicator.

BRIEF DESCRIPTION OF THE DRAWINGS

Reference will now be made to the accompanying drawings, which are not necessarily drawn to scale, and wherein.

DETAILED DESCRIPTION

Figure 1:
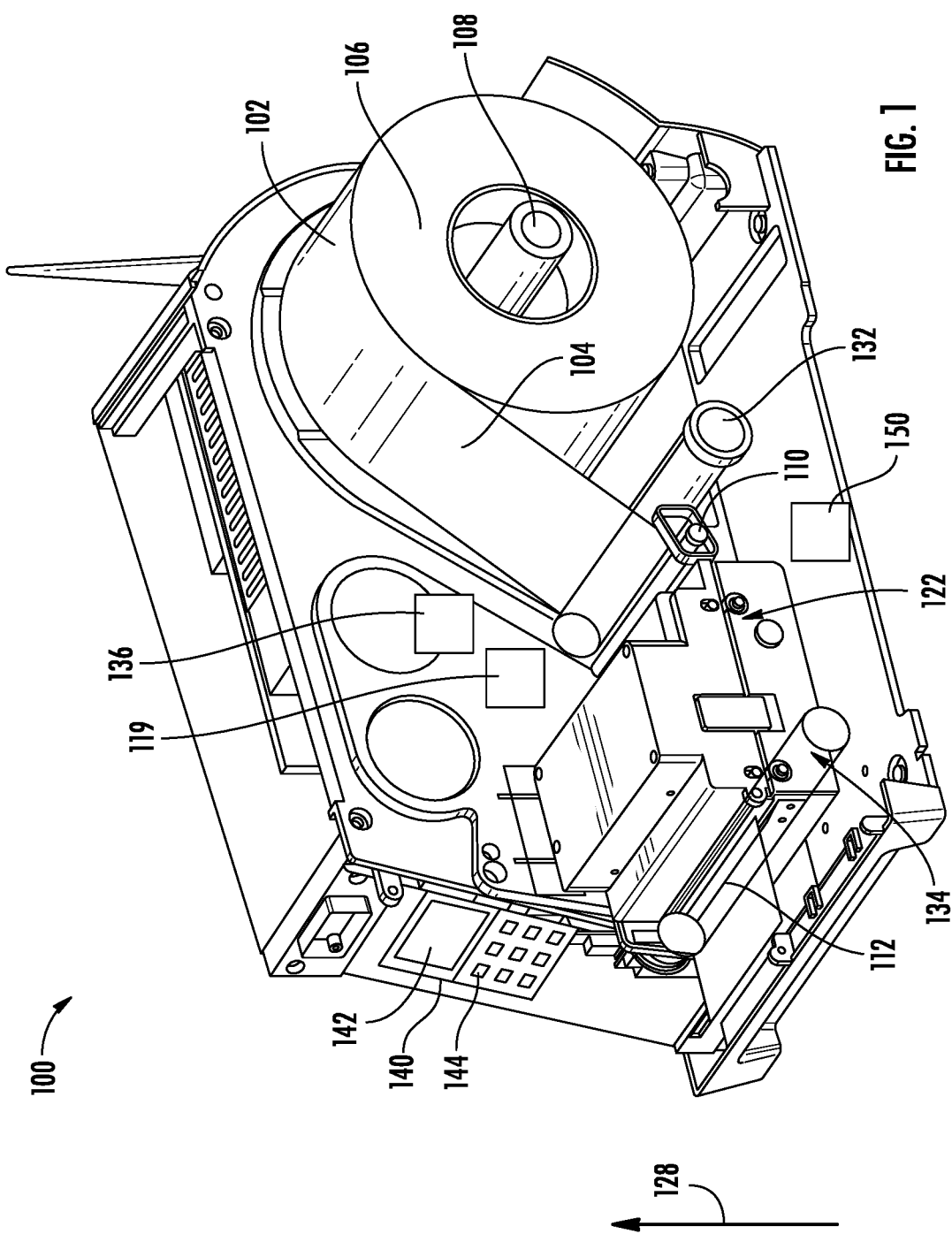
FIG. 1 illustrates a perspective view of an exemplary printing apparatus in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Printing apparatuses, such as copiers, printers, facsimile devices or other systems, are capable of reproducing content, visual images, graphics, texts, etc. on a print media. Some examples of the printing apparatuses may include, but not limited to, thermal printers, inkjet printers, laser printers, and/or the like.

A conventional industrial thermal printer often includes a thermal printhead having multiple resistor elements, i.e. heating elements, in burn lines. During operation, passage of electric current through such resistor elements energizes the resistor elements to perform a printing operation. The energized resistor elements generate heat energy to induce markings on print media by selectively heating specific areas of print media or by heating a thermal transfer media (e.g., a ribbon) for various printing applications, such as label printing. Examples of the thermal printers may include thermal transfer printers and direct thermal printers. Typically, in thermal transfer printer, content is printed on the media by heating a coating of a ribbon so that the coating is transferred to the media.

The word "print media" is used herein to mean a printable medium, such as a page or a paper, on which content, such as graphics, text, and/or visual images, may be printable. The print media may correspond to a continuous media that may be loaded in a printing apparatus in form of a roll or a stack. In some embodiments, the scope of the disclosure is not limited to having a continuous media. In some embodiments, the print media may be divided into one or more portions through perforations defined along a width of the print media. In an alternate embodiment, the print media is divided into the one or more portions through one or more marks that are defined at a predetermined distance from each other, along the length of the print media. In an example embodiment, a contiguous stretch of the print media, between two consecutive marks or two consecutive perforations, corresponds to a portion of the print media. In some embodiments, the print media may correspond to a thermal media on which the content is printed on application of heat on the print media itself. In alternate embodiments, the print media may correspond to a liner media, a liner-less media, and/or the like.

As described herein, a first direction in which the print media exits from the printing apparatus, as disclosed, corresponds to web direction. A second direction that is horizontally orthogonal/transverse to the web direction corresponds to cross-web direction.

Typically, printing apparatuses, such as thermal printers, inkjet printers, or laser printers, reproduce content, visual images, graphics, texts, etc. on a print media. A conventional industrial thermal printer often includes a thermal printhead having multiple resistor elements, i.e. heating elements, in burn lines. During operation, passage of electric current through such resistor elements generate heat energy to induce markings on the print media by selectively heating specific areas of the print media or by heating a thermal transfer media (e.g., a ribbon) for various printing applications, such as label printing. For such printing, the printhead is positioned such that the print media, typically supplied by a media spool, is held in a pressure contact, and sandwiched between the burn line(s) of the printhead and the platen roller. The platen roller is rotationally driven and heating elements in burnlines are selectively activated, in order to suitably produce the desired image.

The present invention includes a method of operating a printing apparatus to generate a haptic alert that corresponds to an operating condition defined by the printing apparatus and is configured to facilitate a user notification of the detected operating condition via a non-visual means. In various embodiments, as described herein, a drive component, such as, for example, a platen roller, may be selectively operated by moving the drive component in one or more alternating directions to cause a resultant vibration of the printing apparatus that may be haptically perceived by a user holding, wearing, and/or otherwise touching the printing apparatus without requiring the user to have a line of sight to the printing apparatus.

Having described example embodiments, the design of the various devices performing various example operations is provided below. The components illustrated in the figures represent components that may or may not be present in various embodiments of the disclosure described herein such that embodiments may include fewer or more components than those shown in the figures while not departing from the scope of the disclosure.

FIG. 1 illustrates a perspective view of a printing apparatus, in accordance with one or more embodiments of the present disclosure. In particular, FIG. 1 illustrates an exemplary printing apparatus 100 configured to execute one or more printing operations wherein, based at least in part on one or more control signals generated and/or received by the printing apparatus 100, a design, text, and/or any other applicable content, or a combination thereof, is printed onto a print media that is dispensed from the printing apparatus 100. For example, in various embodiments, the printing apparatus 100 may embody a mobile and/or desktop thermal (e.g., industrial) printer device. In various examples, the printing apparatus 100 is configured to print on media, such as paper, labels, tickets, tags, continuous stock, etc., which can be dispensed from a roll. The printing apparatus 100 can be configured to use printing ribbon (e.g., thermal transfer ribbon), which can be dispensed from a roll, to print on the media. In other examples, the printing apparatus 100 can be configured to use a printer cartridge. Further, while not shown in FIG. 1, the printing apparatus 100 may comprise a power source, as well as a printer cover for housing various components in the interior of the printing apparatus 100.

As illustrated in FIG. 1, the exemplary printing apparatus 100 may comprise a media supply roll 102. The media supply roll 102 may comprise print media 104 that may be wound on the media supply spool 106. In the example shown in FIG. 1, the printing apparatus 100 may comprise a media supply spindle 108, and the media supply spool 106 that may be configured to be disposed on the media supply spindle 108.

In some examples, the printing apparatus 100 may comprise a media guiding spindle 110, which may be positioned to guide the print media 104 from the media supply roll 102 to travel in a print direction along a print path within the printing apparatus 100. In some examples, the print path may correspond to a path between the media supply spindle 108 to an exit slit 112 along which the print media 104 travels. Further, in some examples, the print direction may correspond to a direction along which the print media 104 travels for the printing operation. For example, along the print direction, the print media 104 travels from the media supply spool 106 towards the exit slit 112. Further, a direction opposite to the print direction (e.g., from exit slit 112 to the media supply spool 106) is referred to as a retract direction. In some examples, after texts, graphics, images and/or the like (as applicable) are imprinted on the print media 104, the print media 104 may exit from the printing apparatus 100 from the exit slit 112.

In various embodiments, an exemplary printing apparatus 100 may comprise one or more drive components communicatively connected to one or more motor assemblies and configured for engagement with at respective portion of the print media such that, based at least in part on a selective operation of the motor assemblies configured to control and/or drive the movement (e.g., rotation) of the one or more drive components, the drive components may be controlled to drive the movement of the print media engaged therewith along the print path (e.g., in the print direction and/or in the retract direction). For example, in various embodiments, a drive component of the exemplary printing apparatus 100 may comprise a motor-driven roller (e.g., a platen roller), a roller assembly, and/or any other driven mechanical component configured for selective rotation about a central axis thereof in both a clockwise and counterclockwise rotational direction. In various embodiments, the one or more drive components of an exemplary printing apparatus 100 may be defined by a plurality of drive components, each being independently moveable (e.g., rotatable) relative to a respective central axis thereof.

As a non-limiting example provided for illustrative purposes, the exemplary printing apparatus 100 illustrated in FIG. 1 includes one or more drive components may be defined at least in part by the media supply spool 106 and/or the media guiding spindle 110.

In some examples, the printing apparatus 100 may comprise a first motor assembly communicatively coupled with a first drive component such that the first motor assembly is configured to control the operation (e.g., rotation) of the first drive component. For example, as illustrated in FIG. 1, in various embodiments, a first motor assembly embodied by a first actuation unit 119 may facilitate a rotation of a first drive component defined by the media supply spool 106 and/or the media guiding spindle 110 in a counterclockwise rotational direction, so as to cause the print media 104 to travel in the print direction along the print path. Additionally, or alternatively, based at least in part on one or more control signals transmitted from the controller 150, the first actuation unit 119 may facilitate rotating of the media supply spool 106 and/or the media guiding spindle 110 in a clockwise rotational direction causing the print media 104 to travel in the retract direction. In an example embodiment, a motor assembly of the printing apparatus 100, such as, for example, the first actuation unit 119, may include one or more of motors that may be, directly or indirectly, coupled to the corresponding one or more drive component (e.g., the media supply spool 106 and the media guiding spindle 110) and communicatively connected to a controller 150 of the printing apparatus 100 such that control signals generated by the controller 150 for controlling the first drive component may be transmitted to the first motor assembly communicatively connected therewith. For example, the first motor assembly configured to drive the operation and/or rotation of the media supply spool 106 and the media guiding spindle 110 may be configured to receive one or more control signals associated with the media supply spool 106 and/or the media guiding spindle 110 from the controller 150.

Further, as described herein and illustrated in FIG. 1, the one or more drive components defined by the printing apparatus 100 may include a first roller 132 and a second roller 134. In an example embodiment, the first roller 132 may be positioned upstream of the print head engine 122 (along the print direction) and the second roller 134 may be positioned downstream of the print head engine 122 (along the print direction). The first roller 132 and the second roller 134 may facilitate the traversal of the print media 104 along the print path. Some examples of the first roller 132 and the second roller 134 may include, but not limited to, a platen roller, a pinch roller, an idle roller, and/or the like. As a non-limiting example, in various embodiments, an exemplary printing apparatus 100 may comprise a drive component that is defined by a platen roller communicatively coupled to a corresponding motor assembly (e.g., a actuation unit) to facilitate selective rotation of the platen roller between each of a first and a second rotational direction (e.g., about a central axis thereof) such that the printing apparatus 100 is configured to selectively drive operation of the platen roller to execute an alert generation operation in which the alert signal is defined by a vibration.

In various embodiments, as depicted in FIG. 1, in various embodiments, the first roller 132 and the second roller 134 may correspond to a single drive component (e.g., a single roller) that may be rotatably coupled to a rigid portion of the housing defined by the printing apparatus 100 and configured to rotate about the respective central axes thereof. However, in some examples, the scope of the disclosure is not limited to drive components defined by the first roller 132 and the second roller 134 being single rollers coupled to an interior surface of the housing of the printing apparatus 100. In an example embodiment, the first roller 132 and the second roller 134 may be part of a roller assembly, that may be collectively operated either synchronously and/or asynchronously.

In an example embodiment, the first roller 132 and the second roller 134 may be communicatively coupled to a first motor assembly (e.g., the first actuation unit 119). For example, the first actuation unit 119 may cause the first roller 132 and the second roller 134 to alternatively and/or selectively rotate in each of a clockwise direction and a counterclockwise direction to facilitate execution of a printing operation (e.g., a print media traversal in the print direction or in the retract direction) and/or an alert generation operation, as described herein. In various embodiments, since the first roller 132 and the second roller 134 may be communicatively coupled to the first actuation unit 119 and the first actuation unit 119 may be coupled to the media supply spool 106, in some examples, the media supply spool 106, the first roller 132 and the second roller 134 may define a plurality of drive components configured to operate synchronously. In some examples, the scope of the disclosure is not limited to the drive components defined by the printing apparatus 100 (e.g., media supply spool 106, the first roller 132 and the second roller 134) being configured to operate synchronously. In an example embodiment, the media supply spool 106, the first roller 132 and the second roller 134 may operate asynchronously. To this end, one or more motor assemblies (e.g., the first actuation unit 119) may independently drive each of the drive components such that the media supply spool 106, the first roller 132 and the second roller 134 illustrated in the exemplary embodiment of FIG. 1 may start rotating, stop rotating, and/or change rotational directions at different time instants. In such an example, the media supply spool 106, the first roller 132 and the second roller 134 may be coupled to the first actuation unit 119 through different gear assemblies (not shown) which may enable the asynchronous operation of the media supply spool 106, the first roller 132 and the second roller 134.

In another implementation, the printing apparatus 100 may include separate actuation units for each of the media supply spool 106, the first roller 132 and the second roller 134 to achieve the asynchronous operation amongst the media supply spool 106, the first roller 132 and the second roller 134. For example, the first roller 132 and media supply spool 106 may be coupled to the first actuation unit 119, while the second roller 134 may be coupled to a second actuation unit 136. In an example embodiment, the second actuation unit 136 may be similar to the first actuation unit 119. All the embodiments and/or alternative applicable of the first actuation unit 119 are also application on the second actuation unit 136.

As described herein, in various embodiments, the one or more drive components of the printing apparatus 100 may be communicatively connected (e.g., directly and/or indirectly) to the controller 150, which may be configured to control the one or more drive components by selectively driving a rotation of the one or more drive components in a first rotational direction about a central axis thereof. For example, in an exemplary circumstance wherein the printing apparatus 100 is executing a printing operation, the controller of the printing apparatus may transmit one or more control signals to the drive components engaged with at least a portion of the print media, such as, for example. a platen roller, to drive a rotation of the drive component (e.g., the platen roller) in a first rotational direction in order to cause the print media to be moved (e.g., by the drive component) in a direction towards a paper outlet defined by the printing apparatus.

In various embodiments, the controller 150 may be communicatively coupled to each of the motor assemblies communicatively connected to the respective drive components (e.g., the first actuation unit 119 and the second actuation unit 136). In some examples, the controller 150 may be configured to control the operation of the printing apparatus 100 to cause the printing apparatus 100 to print content on the print media 104. In another example, the controller 150 may be configured to cause the print media traversal along the print direction.

In various embodiments, an exemplary printing apparatus 100 may define one or more operating condition at a given instance. For example, as described herein, an operating condition defined by the printing apparatus 100 may be defined at least in part by a status of one or more components of the printing apparatus 100 and/or any other identifiable characteristic associated with the operation and/or configuration of the printing apparatus 100 at a particular time. For example, in various embodiments, an operating condition defined by the printing apparatus may be defined at least in part by one or more of an error status, a warning status, a normal operation status, an informational status, and/or the like.

For example, in various embodiments, an error status may be associated with one or more components of the printing apparatus 100 exhibiting a failure and/or undesirably operating in an erroneous manner. As non-limiting examples of various types of errors that may be associated with a component of the printing apparatus 100, an exemplary printing apparatus 100 may exhibit an operating condition defined by one or more error statuses, such as, for example, an "out of print media" error, a " " next label not found" error, a "printer in pause mode" error, an "application break" error, a "printhead lifted" error, a "printhead not detected" error, a "printhead too hot" error, a "motor too hot" error, a power supply too hot" error, a "memory full" error, a "flash memory full" error, "battery low" error, and/or the like, or any combination thereof.

In various embodiments, a warning status may be associated with one or more components of the printing apparatus 100 that remains operable, but exhibits an undesirable configuration that may require user interaction therewith to correct, fix, and/or otherwise adjust the detected condition. As non-limiting examples of various types of warnings that may be associated with a component of the printing apparatus 100, an exemplary printing apparatus 100 may exhibit an operating condition defined by one or more warning statuses, such as, for example, an "upgrading firmware" warning, a "resettable odometer threshold" warning, a "printhead odometer threshold" warning, a "replace printhead" warning, a "clean printhead" warning, a "faulty dot" warning, a "memory low" warning, a "flash memory low" warning, and/or the like, or any combination thereof.

Further, in various embodiments, an informational status may be associated with one or more confirmation, indication, and/or instructional messages that corresponds to one or more operations executed by the printing apparatus 100. As non-limiting examples of various types of information, messages, and/or the like that may be associated with an operation of the printing apparatus 100, an exemplary printing apparatus 100 may exhibit an operating condition defined by one or more informational statuses, such as, for example, a "print job complete" status, a "printer started" status, a "printer is rebooting" status, and/or the like, or any combination thereof.

In various embodiments, an exemplary printing apparatus 100 may be configured such that one or more of the operating conditions defined by the printing apparatus at a particular time, as described above, may be detected by the controller 150. In various embodiments, as described herein, the controller 150 may be configured to control the operation of the printing apparatus 100 to cause the printing apparatus 100 to execute one or more alert generation operations in order to generate an alert signal that provides a perceivable indicator of one or more operating conditions defined by the printing apparatus 100 in a particular instance. As described herein, upon detecting an operating condition at a particular instance, the printing apparatus 100 may be configured to generate an alert signal embodying an indicator of the detected operating condition. The generated alert signal may be configured as perceptible to a user interacting with the printing apparatus 100, such that the user may ascertain that the printing apparatus 100 is exhibiting the detected operating condition at that particular moment.

In various embodiments, the printing apparatus 100 may be configured to generate the alert signal based one or more control signals transmitted from the controller 150 causing the drive components of the printing apparatus 100 to exhibit one or more movements (e.g., rotations) in such a way that causes the printing apparatus to shake, vibrate, rattle, and/or otherwise exhibit a movement that may be haptically perceived by a user in physical contact with the printing apparatus 100 (e.g., and/or a wearable printer case). Further, in various embodiments, the exemplary printing apparatus 100 may be configured to execute an alert generation operation by selectively controlling (e.g., via the controller) the rotation of the one or more drive components between the first rotational direction (e.g., a clockwise direction) and an opposite second rotational direction (e.g., a counterclockwise direction) in order to generate one or more distinct vibrations. For example, operating the drive component by driving consecutive movements of the drive component in alternating rotational directions, such that, based at least in part on the momentum of the drive component, each change in rotational direction as the drive component is switched from rotating in the first rotational direction to rotating in the opposite second rotational direction, and visa versa, may cause at least a portion of the printing apparatus (e.g., the housing) to exhibit a corresponding linear movement. In such an exemplary circumstance, the serial change in rotational direction exhibited by the drive component may be such that the corresponding plurality of linear movements exhibited by the printing apparatus in alternating directions may embody a vibration defined by a force sufficient to be perceived by a user haptically engaged with the printing apparatus (e.g., and/or a wearable printer case). For example, in various embodiments, the resultant vibration generated by the alternating rotation of the drive component may embody an alert signal that is defined by one or more vibration characteristics, such as, for example, vibration intensity, vibration length, vibration quantity, vibration pattern, and/or the like, or any other quantitative characteristic operable to characterize the vibration being exhibited by an exemplary printing apparatus 100.

Figure 2A:
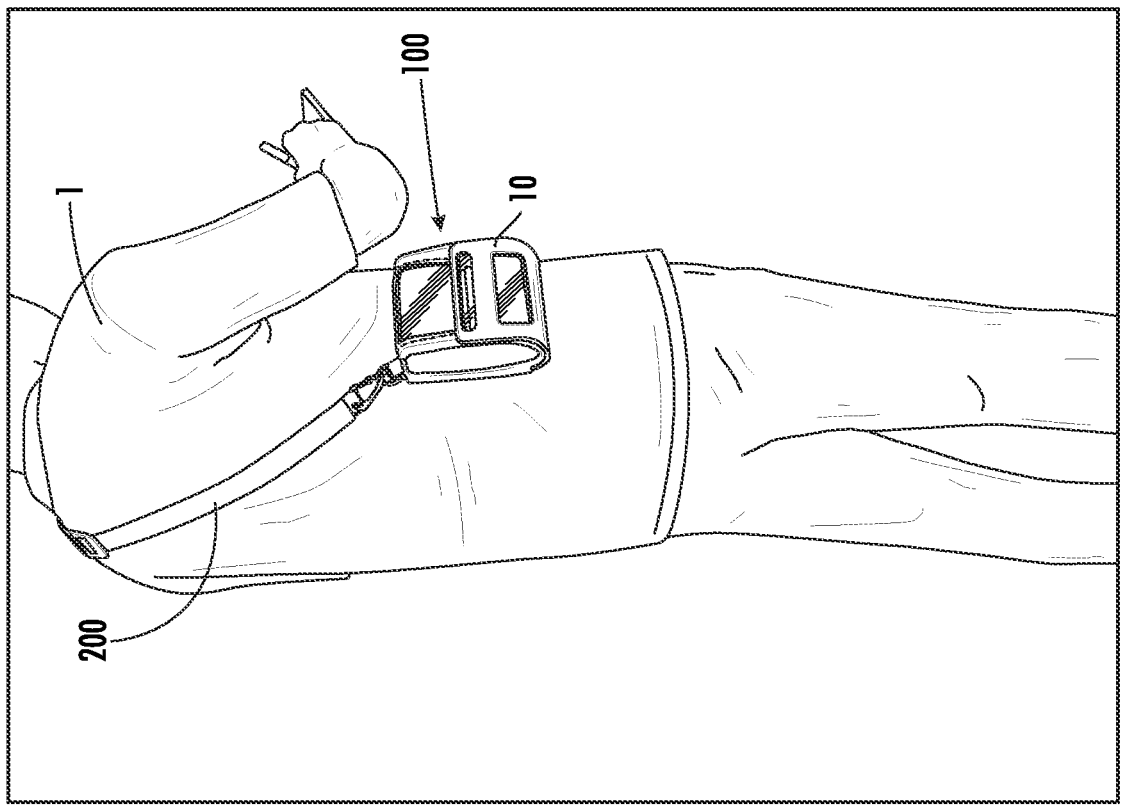
FIG. 2A-2B illustrate various views of an exemplary printing apparatus being housed in a wearable case in accordance with various embodiments of the present disclosure.
Figure 2B:
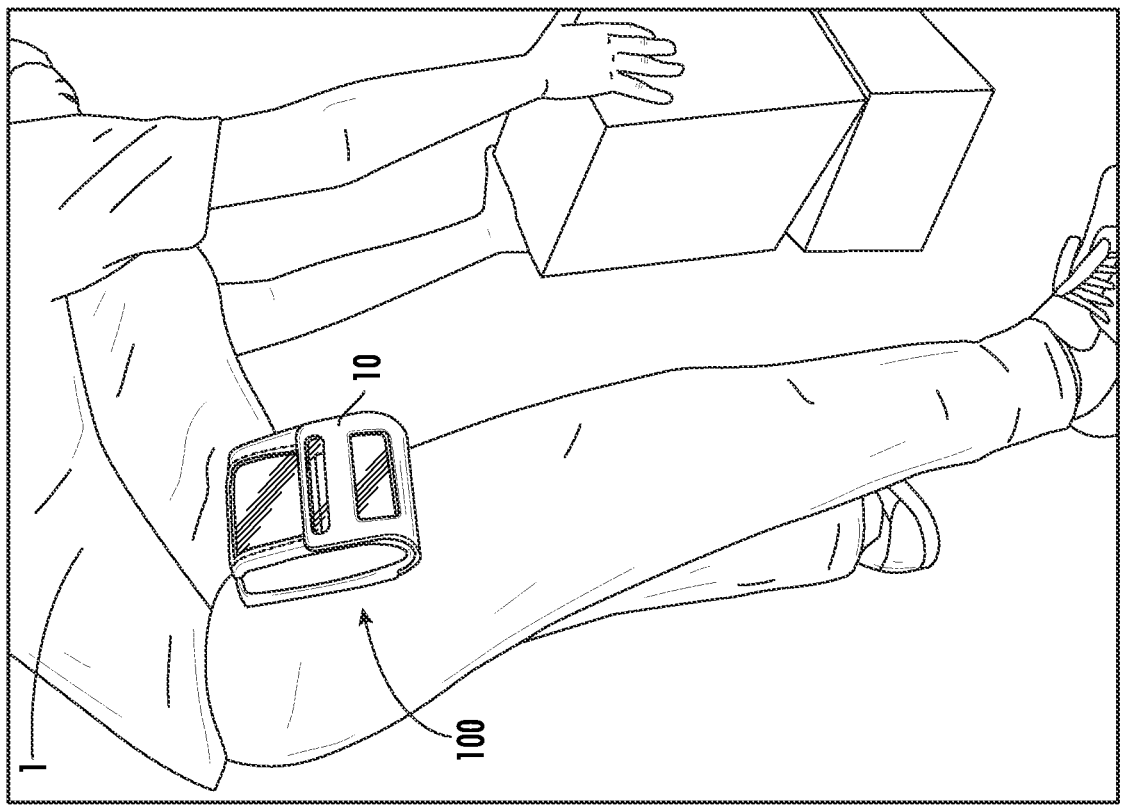

An exemplary alert signal may be generated by causing the drive component to be rotated back-and-forth in opposing rotational directions (e.g., alternating between rotating in the clockwise rotational direction and the counterclockwise direction) in order to cause a resultant vibration of the printing apparatus 100 that may be felt by a user holding and/or wearing the printing apparatus 100. As an illustrative example, FIGS. 2A and 2B illustrate various views of an exemplary printing apparatus 100 (e.g., a mobile printer) being housed in a wearable case 10 such that the printing apparatus 100 is being worn by a user 1. In particular, FIGS. 2A and 2B illustrate various views of an exemplary printing apparatus 100 disposed within the interior of a wearable case 10 configured such that the printing apparatus 100 stored therein is being worn against the body of the user 1 in a hands-free manner. For example, as shown in FIG. 2A, the printing apparatus 100 may be secured against the user's 1 body by wearing the wearable case 10 in a first wearable configuration such that at least a portion of the printing apparatus 100 may be physically pressed against and/or otherwise engaged with a user's hip. in contract, a second wearable configuration, respectively. Further, as shown in FIG. 2B, the printing apparatus 100 may be secured against the user's 1 body by wearing the wearable case 10 in a distinct second wearable configuration, wherein the wearable case 10 (e.g., a strap assembly 200) is configured to be looped around at least a portion of the body of the user 1 such that the printing apparatus 100 disposed in the wearable case 10 may be physically pressed against and/or otherwise engaged with a user's torso. In such exemplary circumstances, the one or more vibrations exhibited by the printing apparatus 100 as a result of the selective alternating rotation of the drive component (e.g., a platen roller) may be enable an alert signal generated by the printing apparatus 100 to be perceived (e.g., haptically) by the user 1 without requiring that the user 1 have a clear line of sight to the printing apparatus 100. For example, in an exemplary circumstance wherein the printing apparatus 100 is housed within a wearable case 10 that is being worn by the user 1, the one or more vibrations defining the alert signal generated (e.g., via the drive components) upon detecting an operating condition may enable a non-visual means of notifying the user of the operating condition defined by the printing apparatus 100, so as to facilitate the perception of the alert signal by the user 1 while the printing apparatus 100 remains disposed within the interior of the wearable case 10.

Further, in various embodiments, each operating condition that may be defined by the printing apparatus 100 and/or detected by the controller 150 may be associated with a unique alert signal that is defined by a vibration having one or more unique vibrational characteristics (e.g., vibration intensity, a vibration length, a vibration quantity, and a vibration pattern, and/or the like) that may be identified as specifically corresponding to the detected operating condition. In such an exemplary configuration, an exemplary printing apparatus 100 may be configured to execute a first alert generation operation associated with a first detected operating condition by selectively controlling at least one of the drive components thereof (e.g., the platen roller) to generate a first alert signal that is embodied as a short, choppy first vibration that functions as an indicator to a user that the printing apparatus 100 is exhibiting a first error status (e.g., an "out of paper media" error). Further, the exemplary printing apparatus 100 may be configured to execute a second alert generation operation associated with a second detected operating condition by selectively controlling the drive component (e.g., the platen roller) to generate a second alert signal that is embodied as a longer, drawn-out, intense second vibration that is perceivably distinct from the first vibration defining the first alert signal. For example, the second vibration may function as an indicator to the user that the printing apparatus 100 is exhibiting a second error status (e.g., a "battery low" error).

In the example shown in FIG. 1, an exemplary printing apparatus 100 may include a user interface (UI) 140 with, for example, a display 142 and a keypad 144. The display 142 may be configured to display various information associated with the printing apparatus 100. The keypad 144 may comprise function buttons that may be configured to perform various typical printing functions (e.g., cancel print job, advance print media, and the like) or be programmable for the execution of macros containing preset printing parameters for a particular type of print media. In some examples, the UI 140 may be electronically coupled to a controller (such as a controller 150) for controlling operations of the printing apparatus 100, in addition to other functions. The UI 140 may be supplemented or replaced by other forms of data entry or printer control, such as a separate data entry and control module linked wirelessly or by a data cable operationally coupled to a computer, a router, or the like.

While FIG. 1 illustrates an example UI 140, it is noted that the scope of the present disclosure is not limited to the example UI 140 as shown in FIG. 1. In some embodiments, the user interface may be different from the one depicted in FIG. 1. In some embodiments, there may not be a user interface.

Figure 3:
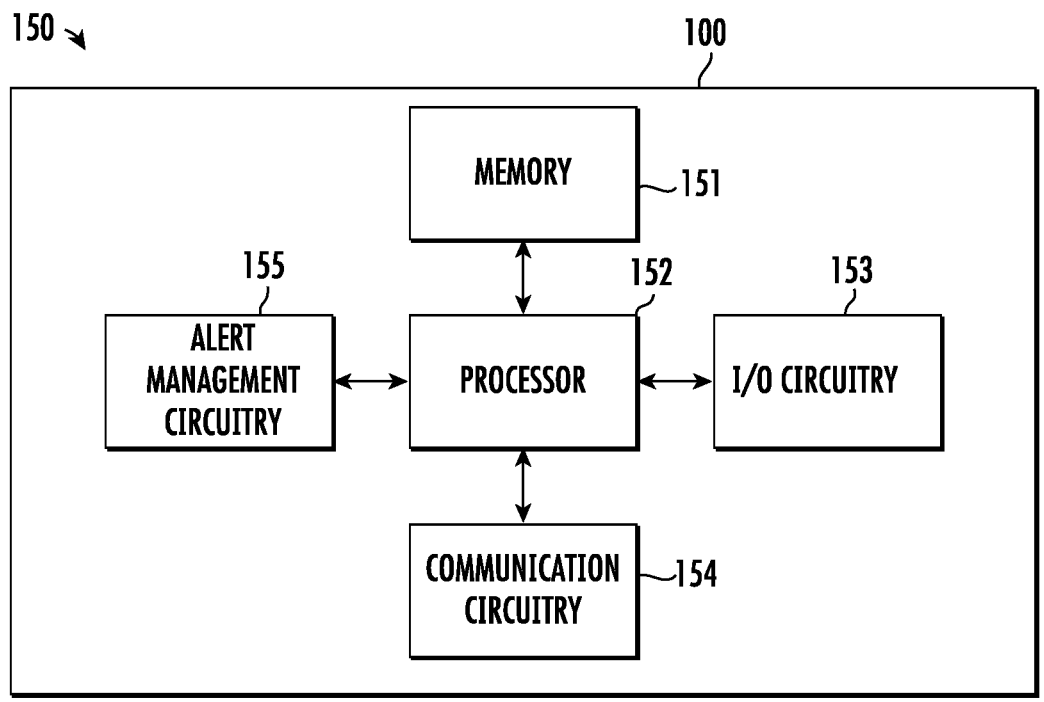
FIG. 3 illustrates a schematic view of an exemplary apparatus in accordance with various embodiments.

FIG. 3 illustrates a schematic view of an exemplary apparatus in accordance with various embodiments described herein. In particular, FIG. 3 illustrates a schematic view of a controller 150 of an exemplary printing apparatus 100, in accordance with various embodiments of the present disclosure. In various embodiments, as illustrated in FIG. 3, an exemplary controller 150 may comprise a memory 151, a processor 152, input/output circuitry 153, communication circuitry 154, and alert management circuitry 155. The controller 150 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 150 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 150 may provide or supplement the functionality of particular circuitry. For example, the processor 152 may provide processing functionality, the memory 151 may provide storage functionality, the communications circuitry 154 may provide network interface functionality, and the like.

In some embodiments, the processor 152 (and/or co-processor or any other processing circuitry assisting or otherwise associated with the processor) may be in communication with the memory 151 via a bus for passing information among components of the apparatus. The memory 151 may be non-transitory and may include, for example, one or more volatile and/or non-volatile memories. For example, the memory 151 may be an electronic storage device (e.g., a computer readable storage medium). In various embodiments, the memory 151 may be configured to store information, data, content, applications, instructions, or the like, for enabling the apparatus to carry out various functions in accordance with example embodiments of the present disclosure. It will be understood that the memory 151 may be configured to store partially or wholly any electronic information, data, data structures, embodiments, examples, figures, processes, operations, techniques, algorithms, instructions, systems, apparatuses, methods, look-up tables, or computer program products described herein, or any combination thereof.

The processor 152 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 152 may be configured to execute instructions stored in the memory 151 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 150 may include input-output circuitry 153 that may, in turn, be in communication with the processor 152 to provide output to the user and, in some embodiments, to receive input such as a command provided by the user. The input-output circuitry 153 may comprise a user interface, such as a graphical user interface (GUI), and may include a display that may include a web user interface, a GUI application, a mobile application, a client device, or any other suitable hardware or software. In some embodiments, the input-output circuitry 153 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, or a combination thereof), or other input-output mechanisms. The processor 152, input-output circuitry 153 (which may utilize the processing circuitry), or both may be configured to control one or more functions of one or more user interface elements through computer-executable program code instructions (e.g., software, firmware) stored in a non-transitory computer-readable storage medium (e.g., memory 151). Input-output circuitry 153 is optional and, in some embodiments, the controller 150 may not include input-output circuitry. For example, where the controller 150 does not interact directly with the user, the controller 150 may generate user interface data for display by one or more other devices with which one or more users directly interact and transmit the generated user interface data to one or more of those devices. For example, the controller 150, using user interface circuitry may generate user interface data for display by one or more display devices and transmit the generated user interface data to those display devices.

The communications circuitry 154 may be a device or circuitry embodied in either hardware or a combination of hardware and software that is configured to receive and/or transmit data from/to a network and/or any other device, circuitry, or module in communication with the apparatus 200. For example, the communications circuitry 154 may be configured to communicate with one or more computing devices via wired (e.g., USB) or wireless (e.g., Bluetooth, Wi-Fi, cellular, and/or the like) communication protocols. For example, as described in further detail herein, the communications circuitry 154 may be configured to facilitate communication between an exemplary printing device and one or more computing devices of an exemplary fluid flow management system via wired (e.g., USB, ethernet, and/or the like) or wireless (e.g., Bluetooth, Wi-Fi, cellular, and/or the like) communication protocols, as described in further detail herein.

In various embodiments, the processor 152 may be configured to communicate with the alert management circuitry 155. The alert management circuitry 155 may be a device or circuitry embodied in either hardware or a combination of hardware and software that is configured to, upon an operating condition associated with the printing apparatus 100 detected (e.g., by a controller 150), generate one or more alert signals corresponding to the detected operating condition to be emitted, exhibited, and/or otherwise made available to a user for perception and/or identification thereof. As described herein, the alert management circuitry 155 may facilitate the generation of a specific alert signal that is configured to be identifiable and uniquely associated with the particular detected operating condition. As such, the generated alert signal may function as a deliberate notification configured to communicate the presence of the detected operating condition defined by the printing apparatus 100 to a user. For example, the alert management circuitry 155 may be configured to enable an alert generation operation to generate an alert signal defined by one or more haptically perceivable vibrations by generating and/or transmitting one or more control signals configured to cause a drive component (e.g., a platen roller) to exhibit a series of movements (e.g., rotations) sufficient to produce a resultant vibration that may be felt and/or otherwise haptically perceived by a user.

Further, in various embodiments, the alert management circuitry 155 may facilitate transmission (e.g., emission, display, exhibition, and/or any other perceivable means of signal communication) of an exemplary alert signal comprising an audio signal (e.g., the selective sounding of an alarm) and/or visual signal (e.g., the selective lighting of an LED) corresponding to a detected operating condition that may embody a perceivable indication of the operating condition (e.g., a light, a sound, a message, and/or the like, or any combination thereof) and/or an instructional message corresponding to the detected operating condition. As described herein, the alert management circuitry 155 may be configured to facilitate transmission of a unique alert signal depending on the specific operating condition that is detected by the printing apparatus 100 (e.g., the controller). For example, upon detecting a first operating condition defined by the printing apparatus 100, the alert management circuitry 155 may transmit one or more control signals configured to initiate and/or drive a selective operation of the drive component through one or more movements (e.g., rotations) known to result in the printing apparatus 100 (e.g., at least a portion thereof) exhibiting a vibration that is specifically identifiable as being indicative of the first operating condition. For example, the alert management circuitry 155 may be configured to generate a first alert signal defined by a first vibration having a first vibrational configuration that corresponds to an error operating condition (e.g., an error status defined by a paper jam error), a second alert signal defined by a second vibrational configuration that corresponds to a warning operating condition (e.g., a warning status defined by a "battery low" warning), a third alert signal defined by a selective lighting of an LED light communicatively coupled to the controller 150 and having a third signal configuration (e.g., a specific color) that corresponds to one or more of the first operating condition and a third operating condition.

As described herein, in various embodiments, an exemplary printing apparatus may be configured to detect an operating condition defined by the printing apparatus. In particular, as described herein, an exemplary printing apparatus may be configured to detect an operating condition associated with one or more components of the printing apparatus and defined at least in part by a status of the one or more components during operation of the printing apparatus. As non-limiting examples provided for illustrative purposes, an exemplary printing apparatus (e.g., a controller) may be configured to detect an operating condition thereof that is defined by an error status, a warning status, a normal status, an informational status, and/or the like, as described herein.

Figure 4:
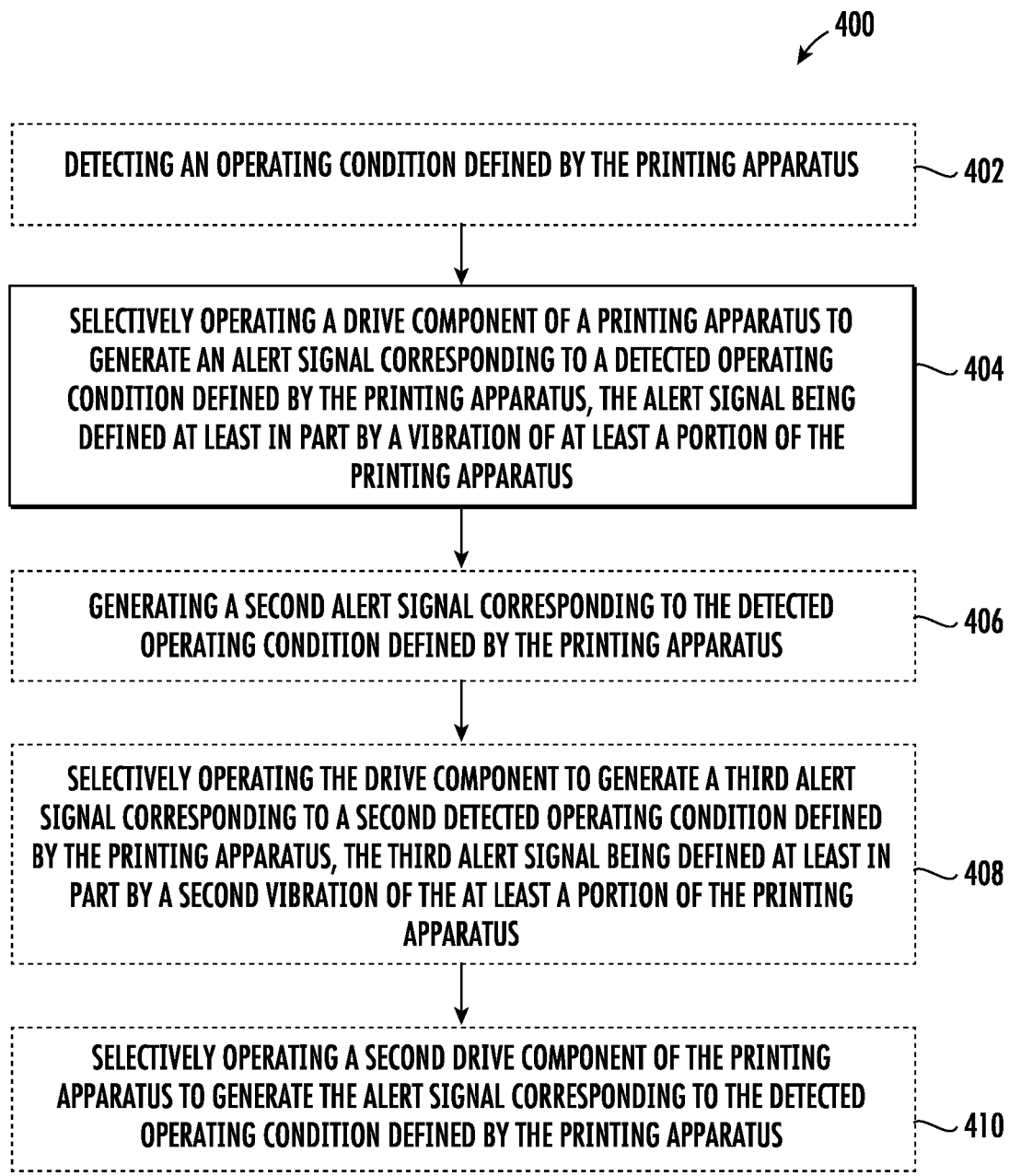
FIG. 4 is an illustrative flowchart of various steps for an example method in accordance with various embodiments of the present disclosure.

For example, referring now to FIG. 4, a flowchart of an exemplary method 400 for operating a printing apparatus to generate to generate an alert signal corresponding to a detected operating condition associated with the printing apparatus is provided. In some embodiments, one or more operations of the illustrated exemplary method 400 may be executed by controlling a printing apparatus in accordance with one or more example embodiments described herein. For example, various operations discussed below with respect to exemplary method 400 may be carried out using various components of an exemplary printing apparatus, such as, for example, exemplary printing apparatus 100 as described above in reference to FIGS. 1-3. In various embodiments, an exemplary printing apparatus utilized to execute one or more operations of exemplary method 400 may comprise a controller, including one or more processors, communicatively connected to a drive component of the printing apparatus and configured to selectively operate the drive component to execute an alert generation operation, as described herein.

As illustrated in FIG. 4, exemplary method 400, at Block 404, may include selectively operating a drive component to generate an alert signal corresponding to a detected operating condition defined by the printing apparatus. In various embodiments, an alert signal defined at least in part by a vibration of at least a portion of a printing apparatus may be generated, such as, for example, by a controller of an exemplary printing apparatus, as described herein. For example, an exemplary printing apparatus may be operated to generate the vibration in order to provide a perceivable means of indicating that one or more operational conditions is present within and/or being exhibited by the exemplary printing apparatus.

In various embodiments, as illustrated at Block 402, the exemplary method 400 may include detecting an operating condition defined by the printing apparatus. As described herein, an operating condition may be defined by a detected status of one or more components of the printing apparatus that is indicative of the printing apparatus during operation thereof. In various embodiments, upon a first operating condition apparatus being detected in associate with the printing apparatus (e.g., via a controller), an alert signal configured to function as a perceivable notification that the first operating condition has been detected may be generated. For example, the alert signal corresponding to the first operating condition may be generated by controlling one or more motor-driven movements (e.g., rotations) of a drive component to cause a resultant vibration of at least a portion of the printing apparatus. As described herein, such a vibration may be felt by a user interacting with (e.g., holding and/or wearing) the printing apparatus, which may be identified by the user as a notification that corresponds to the first operating condition being defined by the printing apparatus at that particular instance. For example, in various embodiments, one or more control signals may be transmitted from a controller of an exemplary printing apparatus to a drive motor operably connected to a drive component (e.g., a platen roller within the printing apparatus) in order to cause the drive component to rotate in alternating first and second rotational directions such that the printing apparatus exhibits a resultant vibration that is haptically perceivable and functions as an indicator (e.g., a notification to the user) of the detected operational condition.

Figure 5:
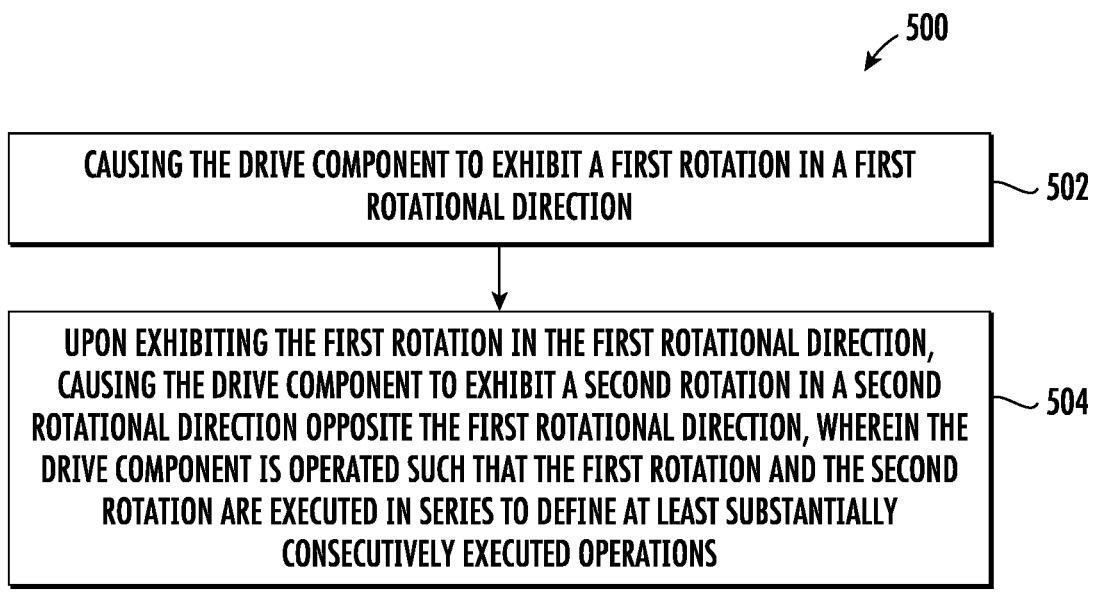
FIG. 5 is an illustrative flowchart of various steps for an example method in accordance with various embodiments of the present disclosure.

For example, referring now to FIG. 5, a flowchart of exemplary operations of the method step illustrated at Block 404 of method 400 is provided. In particular, the exemplary method 500 illustrated in FIG. 5 includes a flow chart of exemplary steps that may be executed as part of selectively operating a drive component to generate an alert signal corresponding to a detected operating condition defined by the printing apparatus, as described herein. In various embodiments, as illustrated at Block 502, the exemplary method step of selectively operating a drive component to generate an alert signal corresponding to a detected operating condition defined by the printing apparatus may comprise causing the drive component to exhibit a first rotation in a first rotational direction. For example, one or more control signals may be transmitted from a controller to a motor assembly configured to drive operation of the drive component engaged with a print media in order to cause the drive component to rotate in the first rotational direction, as defined relative to the central axis thereof.

Further, at Block 504, upon exhibiting the first rotation in the first rotational direction, the method 500 may continue with causing the drive component to exhibit a second rotation in a second rotational direction opposite the first rotational direction. For example, in an exemplary embodiment wherein the first rotational direction is defined by the counterclockwise direction about the central axis of the drive component, the second rotation in the opposite second rotational direction may be defined by a subsequent rotation of the drive component in the clockwise direction about the central axis. For example, the drive component may be operated such that the first rotation and the second rotation are executed in series to define at least substantially consecutively executed operations. In various embodiments, based at least in part on the momentum of the drive component engaged with the print media as it rotates about the central axis, causing the drive component to change rotational directions between the first and second rotational directions in one or more consecutive instances as a result of one or more serially transmitted control signals may cause the printing apparatus to exhibit one or more resultant linear movements that, collectively, embody a vibration of the printing apparatus. In various embodiments, selectively operating the drive component to generate an alert signal defined by a vibration of the printing apparatus may include transmitting one or more (e.g., a series) of control signals to a motor assembly configured to control the drive component to drive the drive component through a series of alternating rotations in the first and second rotational directions, respectively, in order to cause the resultant vibration that may be perceived (e.g., haptically) by a user engaged with and/or operating the printing apparatus.

Referring back to FIG. 4, the exemplary method 400 may further comprise, as illustrated at Block 406, generating a second alert signal corresponding to the detected operating condition defined by the printing apparatus. In various embodiments, a plurality of alert signals corresponding to the same detected operating condition may be generated. For example, upon detecting an operating condition defined by a printing apparatus, a first alert signal corresponding to the detected operating condition and a second alert signal corresponding to the detected operating condition may each be generated as respective notifications configured to be perceived and/or identified by a user as an indication that the detected operating condition is presently defined by the printing apparatus. As a non-limiting example provided for illustrative purposes, the drive component may be selectively operated to generate a first alert signal defined by a vibration this is configured to transmit one or more forces to the body of a user against which the printing apparatus is being worn. In such an exemplary circumstance, the vibration defining the first alert signal may provide a haptic indication to the user that an operating condition corresponding to the specific vibration pattern exhibited by the printing apparatus has been detected. Further, in various embodiments, the second alert signal, such as, for example, a selective lighting of a light element (e.g., an LED) of the printing apparatus that corresponds to the detected operating condition, may be generated to provide a visual indication to the user of the specific operating condition that has been detected.

Further, in various embodiments, a first alert signal and a second alert signal corresponding to a detected first operating condition and a detected second operating condition distinct from the first operating condition may be generated to facilitate a user notification that each of the first and second operating conditions has been detected. As a non-limiting example provided for illustrative purposes, in various embodiments wherein a first operating condition corresponding to an error status (e.g., a paper jam error) is detected, one or more control signals may be transmitted to cause the drive component to rotate through a specifically controlled series of alternating rotations in order to produce a resultant vibration (e.g., of the printing apparatus) that embodies a haptic alert corresponding specifically to the detected first operating condition. Further, in various embodiments, upon a second operating condition corresponding to a warning status (e.g., a low battery warning) being detected, one or more control signals may be transmitted to cause the selective illumination of a particular light element (e.g., a green LED) that embodies a visual alert corresponding specifically to the detected second operating condition.

In various embodiments, as illustrated at Block 408, the drive component of the printing apparatus may be selectively operated to generate a third alert signal corresponding to a second detected operating condition defined by the printing apparatus. In various embodiments, generating the third alert signal may be defined at least in part by controlling the drive component to cause a resultant second vibration of at least a portion of the printing apparatus in order to provide a perceivable means of indicating that the second detected operating condition is present within and/or being exhibited by the exemplary printing apparatus.

In various embodiments, as illustrated at Block 410, wherein an exemplary printing apparatus comprises a plurality of drive components that are each independently rotatable about a respective central axis and configured for engagement with a respective portion of the print media to facilitate the movement of the print media in one or more directions along a print path defined within the printing apparatus, including the drive component described above with respect to Block 404 and a second drive component, the second drive component may be selectively operated to contribute to the generation of the alert signal described above with respect to Block 404. In such an exemplary circumstance, both the drive component and the second drive component may be selectively operated to cause the vibration defining the alert signal to be generated.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of operating a printing apparatus to generate an alert signal corresponding to a detected operating condition associated with the printing apparatus, the method comprising:
    selectively operating a drive component to generate an alert signal corresponding to a detected operating condition defined by the printing apparatus, the alert signal being defined at least in part by a vibration of at least a portion of the printing apparatus,
    wherein the drive component is configured to be operably engaged with at least a portion of a print media disposed within the printing apparatus such that the operation of the drive component causes a corresponding movement of the print media along a printing path defined by the printing apparatus; and
    wherein an operation of the drive component is defined at least in part by a rotation of the drive component in one or more rotational directions about a central axis.

2. The method of claim 1, wherein selectively operating the drive component to generate the alert signal comprises:
    causing the one or more drive components to exhibit a first rotation in a first rotational direction; and
    upon exhibiting the first rotation in the first rotational direction, causing the drive component to exhibit a second rotation in a second rotational direction opposite the first rotational direction, wherein drive component is operated such that the first rotation and the second rotation are executed in series to define at least substantially consecutively executed operations.

3. The method of claim 2, wherein the vibration is defined at least in part by a movement of the at least a portion of the printing apparatus resulting from the first rotation and the second rotation.

4. The method of claim 2, wherein causing the one or more drive components to exhibit the first rotation and the second rotation includes generating, via a controller, one or more control signals configured to cause the drive component to exhibit the first rotation and the second rotation, and transmitting the one or more control signals to a motor assembly communicatively connected to the drive component.

5. The method of claim 2, wherein selectively operating the drive component to generate the alert signal further comprises:
    upon exhibiting the second rotation in the second rotational direction, causing the drive component to exhibit a third rotation in the first rotational direction, wherein drive component is operated such that the third rotation is executed in series with the first rotation and the second rotation.

6. The method of claim 1, wherein the vibration defining the alert signal is defined by a plurality of linear movements of the at least a portion of the printing apparatus.

7. The method of claim 6, wherein the linear movements defining the vibration are of a sufficient magnitude such that the vibration is perceptible to a user via a haptic sensing means.

8. The method of claim 1, further comprising detecting, via a controller, the operating condition defined by the printing apparatus.

9. The method of claim 1, wherein the drive component comprises a platen roller disposed at least partially within the printing apparatus and configured to rotate in one of a first rotational direction and a second rotational direction about the central axis to facilitate a movement of the at least a portion of the print media engaged therewith.

10. The method of claim 9, wherein operating the drive component comprises selectively operating a drive motor communicatively connected to the platen roller by transmitting one or more control signals to the drive motor to drive the rotation of the platen roller about the central axis.

11. The method of claim 1, further comprising selectively operating a plurality of drive components to generate the alert signal.

12. The method of claim 11, wherein operating the plurality of drive components includes transmitting one or more control signals to the plurality of drive components to cause each of the plurality of drive components to rotate about the respective central axes in the same rotational direction.

13. The method of claim 1, further comprising selectively operating the drive component to generate a second alert signal corresponding to a second detected operating condition defined by the printing apparatus, the second alert signal being defined at least in part by a second vibration of the at least a portion of the printing apparatus.

14. The method of claim 13, wherein the first vibration defining the alert signal is defined at least in part by a first vibration pattern, and wherein the second vibration defining the second alert signal is defined at least in part by a second vibration pattern that is at least substantially different than the first vibration pattern.

15. The method of claim 14, wherein the first vibration defining the alert signal is defined by one or more vibration characteristics, the one or more vibration characteristics being defined by one or more of a vibration intensity, a vibration length, a vibration quantity, and a vibration pattern.

16. The method of claim 13, wherein the detected operating condition is defined by one or more of an error status and a warning status associated with one or more components of the printing apparatus at a particular instance.

17. The method of claim 16, wherein the detected operating condition is defined by a normal operation status associated with one or more components of the printing apparatus at the particular instance.

18. The method of claim 16, further comprising detecting, via a controller, the detected operating condition and a second detected operating condition defined by the printing apparatus.

19. The method of claim 18, wherein the second detected operating condition is defined by a second error status associated with a second component of the printing apparatus at the particular instance.

20. The method of claim 1, further comprising generating a second alert signal corresponding to the detected operating condition defined by the printing apparatus, the second alert signal being defined by an LED indicator.

* * * * *